NON-RECIPROCAL WAVE TRANSMISSION NETWORKS

Filed Dec. 27, 1951 2 Sheets-Sheet 1

INVENTOR
S. E. MILLER
BY H. O. Wright
ATTORNEY

NON-RECIPROCAL WAVE TRANSMISSION NETWORKS

Filed Dec. 27, 1951 2 Sheets-Sheet 2

INVENTOR
S. E. MILLER
BY H. O. Wright
ATTORNEY

United States Patent Office 2,748,352

Patented May 29, 1956

2,748,352

NON-RECIPROCAL WAVE TRANSMISSION NETWORKS

Stewart E. Miller, Middletown, N. J., assignor to Bell Telephone Laboratories, Incorporated, New York, N. Y., a corporation of New York Application December 27, 1951, Serial No. 263,600

7 Claims. (Cl. 333—14)

Figures 1, 2, 6:
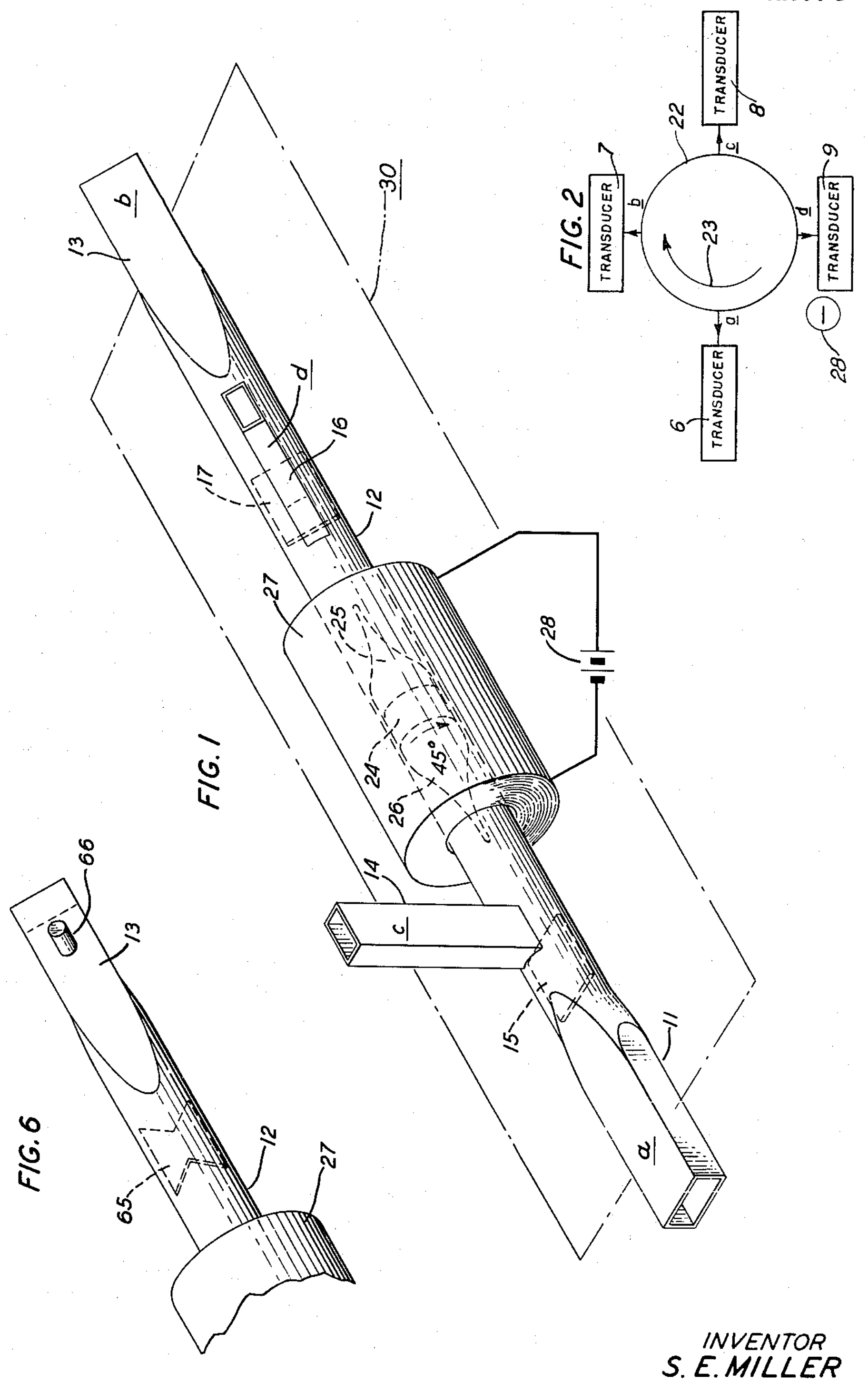

This invention relates to electrical transmission systems and, more particularly, to multibranch circuits having non-reciprocal transmission properties for use in said systems.

It is an object of the invention to establish non-reciprocal electrical connections between a plurality of branches of a multibranch network.

It is a more specific object of the invention to simplify and improve apparatus for modifying the range of electrical signal amplitudes by utilizing said non-reciprocal connections.

In many electrical transmission systems, particularly those systems in which signals in the microwave frequency range are to be multiplexed, it is desirable to compress the amplitude characteristic of a signal before it is multiplexed and transmitted to a receiving station. Likewise, at the receiving station it is desirable to expand the received signal to restore to it the original amplitude relationships. Numerous circuits are known to the art by which these operations may be accomplished. A preferred class of these circuits utilize the properties of non-linear impedance elements connecting in some manner the input and output circuits of the expander or compressor. For the devices in this class to operate efficiently and effectively, a form of balance must be presented at the input circuit, balance in this sense meaning that no component of the signal which has been affected by the non-linear impedance is able to return to the input circuit. This requirement imposes severe restrictions in the prior art circuits upon the identical nature of the several non-linear impedances required and upon the critical phase differences which must be maintained. Each of these restrictions is difficult, if indeed not impossible, to realize by means of known prior art arrangements at high frequencies over a broad frequency band and over a broad range of amplitude variations.

It is, therefore, a further object of the invention to improve the effective balance presented at the input circuit of a compressor or an expander circuit over a broad band of high frequency electromagnetic signals.

In the specific embodiments in accordance with the invention, to be hereinafter described in detail, the non-reciprocal property of a multibranch network interconnecting various electrical components is supplied by a Faraday-effect element. As will be shown, this element rotates the polarization of the electric vector of electrical energy passing through it with respect to a plurality of spatially related branches or connecting terminals in such a way that energy appearing in one branch or terminal thereof is coupled to only one other terminal for a given direction of transmission but to another terminal for the opposite direction of transmission.

In a specific embodiment of the invention, in accordance with the last two mentioned objects hereof, a source of signal input energy, an output circuit and an impedance element having a particular non-linear characteristic are interconnected by particular branches of said multibranch network. As will be shown, the non-reciprocal network applies an input signal to the non-linear element but at the same time isolates the signals modified by the non-linear element from the input. Similarly, the same non-reciprocal network applies the modified signals to an output circuit, but isolates the non-linear element from signal components that may be reflected from an imperfect impedance match at the output circuit.

Special features of the invention reside in the particularly advantageous combinations of compressor and expander circuits with other components resulting in an improved multiplex system for electromagnetic wave transmission.

These and other objects and features of the invention, the nature of the present invention and its advantages, will appear more fully upon consideration of the various specific illustrative embodiments shown in the accompanying drawings and of the following detailed description of these embodiments.

Figures 3, 4, 5:
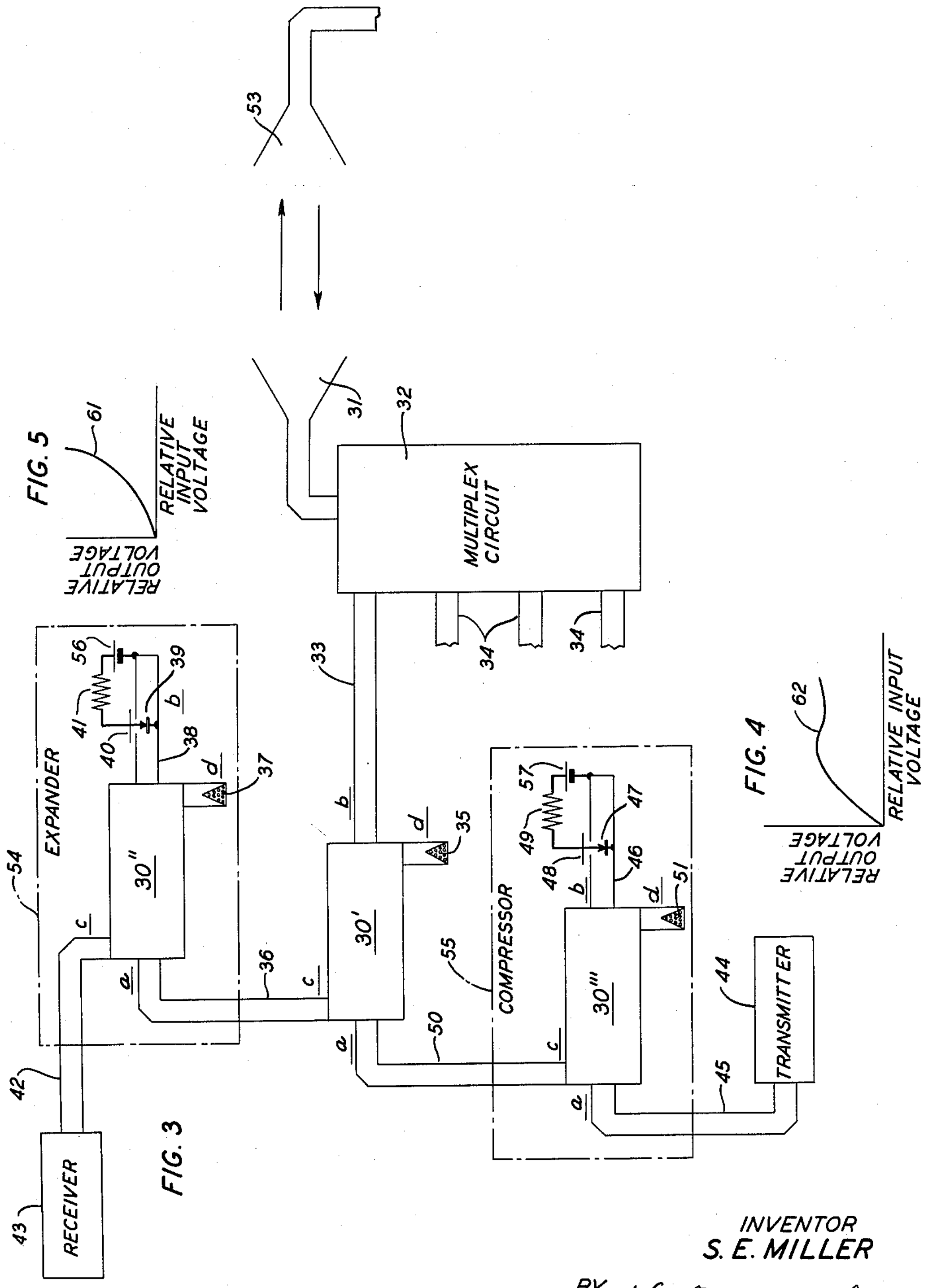

In the drawings:

Fig. 1 is a perspective view of a non-reciprocal multibranch network, in accordance with the present invention, and which is employed as a component part in the circuit arrangements illustrated in subsequent figures;

Fig. 2, given for the purpose of explanation, is a diagrammatic representation of the coupling characteristics of the non-reciprocal network of Fig. 1;

Fig. 3 shows in diagrammatic form a multiplex system employing a compressor and an expander circuit, all in accordance with the invention;

Fig. 4, given for the purpose of explanation, represents the characteristic of the non-linear impedance element employed in the compressor portion of Fig. 3;

Fig. 5, given for the purpose of explanation, represents the characteristic of the non-linear impedance element employed in the expander portion of Fig. 3; and Fig. 6 illustrates a modification of the multibranch network of Fig. 1, particularly suitable for use in the arrangements shown in Fig. 3.

In more detail, Fig. 1 illustrates a non-reciprocal four branch microwave network in accordance with the present invention and of the general type also disclosed in the copending applications of C. L. Hogan, Serial No. 252,432, filed October 22, 1951, and of W. W. Mumford, Serial No. 263,656, filed December 27, 1951. Inasmuch as this network is employed several times as a component element in the arrangement of Fig. 3, the network and its connections being indicated schematically in Fig. 3, a complete description of the network, its construction and operation, and the electrical connections obtained thereby will first be given. For convenience hereinafter and in the appended claims, the network will be designated as a "circulator" circuit. The suitability of this term will become apparent after its electrical properties have been examined.

The circulator, the wave-guide network included in box 30 of Fig. 1 interconnecting the terminals *a*, *b*, *c* and *d*, comprises a circular wave guide 12 which tapers smoothly and gradually from its left-hand end into a rectangular wave guide 11 and which is joined near said end by a second rectangular guide 14 in a shunt or H-plane junction. The rectangular wave guides 11 and 14 will accept and support only plane waves in which the component of the electric vector, which determines the plane of polarization of the wave, is consistent with the dominant $TE_{10}$ mode in rectangular wave guide. Likewise, the dimension of guide 12 is preferably chosen so that only the several polarizations of the dominant $TE_{11}$ mode in it can be propagated. By means of the smooth transition from the rectangular cross-section of guide 11 to the circular cross-section of guide 12, the $TE_{10}$ mode, that wave energy having a plane of polarization parallel to the narrow dimension of the rectangular cross-section of guide 11, may be coupled to and from the $TE_{11}$ mode in circular guide 12 which has a similar or parallel polarization. Any other polarization of wave energy in guide 12 will not pass through the polarization-selective terminal comprising guide 11. Guide 14 is physically oriented with respect to guides 11 and 12 so that the $TE_{10}$ mode in guide 14 is coupled by way of the shunt plane junction between the rectangular cross-section of guide 14 and the circular cross-section of guide 12 into the particular $TE_{11}$ mode in circular guide 12 which is polarized perpendicular to the $TE_{11}$ mode introduced by guide 11. Thus, guides 11 and 14 comprise a pair of polarization-selective connecting terminals by which wave energy in two orthogonal $TE_{11}$ mode polarizations may be coupled to and from one end of guide 12. Furthermore, these guides comprise a pair of conjugately related terminals or branches inasmuch as a wave launched in one will not appear in the other.

In accordance with the disclosure in the copending application of A. P. King, Serial No. 260,137, filed December 6, 1951, now U. S. Patent No. 2,682,610, issued June 29, 1954, a highly conductive reflecting vane 15, which may be in the order of one-half wavelength in length, is preferably diametrically disposed in circular guide 12 opposite the junction aperture of guide 14 to reflect into guide 14 those waves having their plane of polarization coincident with the plane of vane 15.

At the other end of guide 12 is a similar pair of polarization-selective conjugate terminals comprising rectangular guides 13 and 16 coupled to orthogonally related waves in guide 12 which waves are polarized in planes 45 degrees inclined to the planes of the corresponding waves, respectively, to which guides 11 and 14 are coupled. Thus, guide 12 tapers into a rectangular guide 13 which supports a wave polarized in a plane inclined 45 degrees with respect to the polarization of the wave in guide 11. Guide 12 is joined in a shunt plane junction by a second rectangular guide 16 which is perpendicular to both guides 12 and 13 and which will accept waves from guide 12 having a plane of polarization inclined at 45 degrees to the polarization of those waves accepted by guide 14. A highly conductive reflecting vane 17 is positioned with respect to the aperture of guide 16 and bears the same relation thereto as vane 15 to the aperture of guide 14. It is obvious to one skilled in the art that any of a number of other well-known coupling means may be employed in lieu of one or more of the wave guides 11, 13, 14 and 16 to couple to and from the proper polarizations of waves in guide 12.

Interposed between the first pair of conjugate terminals comprising guides 11 and 14 and the second pair of conjugate terminals comprising guides 13 and 16 in the path of wave energy passing therebetween in guide 12 is suitable means of the type which produces an antireciprocal rotation of the plane of polarization of these electromagnetic waves, for example, a Faraday-effect element having such properties that an incident wave impressed upon a first side of the element emerges on the second side polarized at a different angle from the original wave and an incident wave impressed upon the second side emerges upon the first side with an additional rotation of the same angle. Thus, the polarization of a wave passing through the element first in one direction and then in the other undergoes two successive space rotations or space phase shifts in the same sense, thereby doubling the rotation undergone in a single passage. As illustrated by way of example in the drawing, this means comprises a Faraday-effect element 24 with accompanying conical transition members 25 and 26 which may be of polystyrene and are provided to cut down reflections from the faces of element 24, mounted inside guide 12 approximately midway between the conjugate pairs. As a specific embodiment, element 24 may be a block of magnetic material, for example nickel-zinc ferrite prepared in the manner disclosed in the above-mentioned copending application of C. L. Hogan, having a thickness of the order of magnitude of a wavelength. This material has been found to operate satisfactorily as a directionally selective Faraday-effect rotater for polarized electromagnetic waves to an extent up to 90 degrees or more when placed in the presence of a longitudinal magnetizing field of strength which is readily produced in practice and in such thickness is capable of transmitting electromagnetic waves, for example in the centimeter range, with substantially negligible attenuation. Suitable means for producing the necessary longitudinal magnetic field surrounds element 24 which means may be, for the purpose of illustration, a solenoid 27 mounted upon the outside of guide 12 and supplied by a source 28 of energizing current. It should be noted, however, that element 24 may be permanently magnetized or element 27 can be a permanently magnetized structure. The angle of rotation of polarized electromagnetic waves in such magnetic material is approximately directly proportional to the thickness of the material traversed by the waves and to the intensity of the magnetization to which the material is subjected, whereby it is possible to adjust the amount of rotation by varying or properly choosing the thickness of the material comprising element 24 and the intensity of magnetization supplied by solenoid 27.

In the simplified view of the phenomenon involved as offered in said Hogan application, a plane polarized wave incident upon the magnetic material in the presence of the magnetic field produces two sets of secondary waves in the material, each set of secondary waves being circularly polarized. The two sets of secondary waves are circularly polarized in opposite senses and they travel through the medium at unequal speeds. Upon emergence from the material the secondary waves in combination set up a plane polarized wave, which is in general polarized at a different angle from the original wave. It should be noted that the Faraday rotation depends for its direction upon the direction of the magnetic field. Thus, if the direction of the magnetic field is reversed, the direction of the Faraday rotation is also reversed in space while retaining its original relationship to the direction of the field.

The operation of the circulator circuit of Fig. 1 may be conveniently explained with reference to the diagram of Fig. 2. Thus, a vertically polarized wave introduced at terminal *a* from a transducer 6 as shown on Fig. 2 acting as a source of wave energy into guide 11 travels past the aperture of guide 14 and its associated vane 15 unaffected thereby inasmuch as the effective polarization of these components is perpendicular to the polarization of the wave, and past transition member 26, to element 24. The thickness of element 24 and the potential from source 28 are adjusted, as pointed out thereinbefore, to give a 45 degree rotation of the plane of polarization in the same direction as the angle existing between the first pair of terminals comprising guides 11 and 14 and the second pair of terminals comprising guides 13 and 16. Thus, as shown on Fig. 1, the polarization of the wave is rotated 45 degrees in a clockwise direction, as indicated by the arrow on element 24 in the drawing, thereby bringing the plane of polarization of the wave into the preferred direction for transmission unaffected past guide 16 and into the preferred polarization for passage through guide 13 to terminal *b* and transducer 7 as shown on Fig. 2 acting as a utilizing means. Substantially free transmission is therefore afforded from terminal *a* and transducer 6 to terminal *b* and transducer 7 and this condition is indicated on Fig. 2 by the radial arrows labeled *a* and *b*, respectively, associated with a ring 22, and an arrow 23 diagrammatically indicating progression in the sense from *a* to *b*.

Should a wave having the same polarity as the wave heretofore described as leaving terminal *b* by guide 13, be applied from transducer 7 acting now as a source to guide 13, it will be transmitted unaffected past the conjugate guide 16 to element 24. This wave will be rotated 45 degrees by element 24 in the direction of the arrow thereon, bringing the wave into a horizontal polarization at the aperture of guide 14 into which it will be reflected by vane 15 for passage to terminal *c* and a transducer 8 acting as a utilizing means. This transmission is indicated by arrow 23 on Fig. 2 which tends to turn the arrow *b* in the direction of the arrow *c*.

Should a wave having the same polarity as the wave heretofore described as leaving terminal *c* by guide 14, be applied to guide 14 from transducer 8 acting now as a source, it will be launched in guide 12 in a polarization conjugate to guide 11 and will travel to element 24. Element 24 again rotates its polarization 45 degrees in the direction of the arrow, bringing the wave into the preferred polarization for passage by guide 16 to terminal *d* and transducer 9 acting as a utilizing means. This transmission is indicated by the arrow 23 on Fig. 2 which tends to turn the arrow *c* in the direction of the arrow *d*. Similarly, if a wave having the same polarization as the wave heretofore described as leaving terminal *d* by guide 16, is applied from transducer 9 acting as a source to guide 16, it will be launched in guide 12 in a polarization conjugate to guide 13 and will travel to element 24, where it receives a further 45 degree rotation in the direction of the arrow, bringing its plane of polarization into the preferred direction for transmission through guide 11 to terminal *a* and transducer 6 acting now as a utilizing means. This passage is similarly indicated on Fig. 2 by the schematic coupling between the terminals *d* and *a*.

Assuming an initial polarization of the wave as that in guides 11 and 13 for the passage from terminal *a* to *b*, in guide 14 after the passage from terminal *b* to *c*, and in guide 16 after the passage from terminal *c* to *d*, it will be seen that on passage from terminal *d* to *a*, the wave leaving guide 11 has been inverted or has experienced a phase shaft of 180 degrees with respect to the assumed initial polarization. This phase inversion is indicated on Fig. 2 by a minus sign 28 in the quadrant between arrows *d* and *a*.

Considering the above-described transmission characteristics as they are indicated diagrammatically on Fig. 2, the applicability of the term "circulator" as a descriptive name for the non-reciprocal four terminal network of Fig. 1 is apparent. Transmission of waves at *a* takes these waves in circular fashion to terminal *b*, transmission from *b* leads to terminal *c*, transmission from *c* leads to terminal *d*, and transmission from terminal *d* leads to terminal *a*. Thus, each terminal is coupled around the circle to only one other terminal for a given direction of transmission, but to another terminal for the opposite direction of transmission.

Considering this transmission from a different aspect, it will be seen that terminals *a* and *c* are initially conjugate to each other and that terminals *b* and *d* are likewise initially conjugate to each other. Element 24 introduces such a value of directional space phase shift that terminal *a* is in coupling relationship to terminal *b* for the direction of transmission from *a* to *b* and in conjugate relationship to terminal *d* for the direction of transmission from *a* to *d*. Inherently, therefore, terminal *c* is in coupling relationship to terminal *d* for the direction of transmission from *c* to *d*, and in conjugate relationship for the direction of transmission from *c* to *b*. Similar relationships of unidirectional coupling and conjugacy exist in transmission from terminals *b* and *d* to terminals *a* and *c*.

Having thus analyzed the structure and characteristics of the circulator, consideration may be given to the circuit arrangement of Fig. 3 which incorporates three circulators, each of which may be of the type illustrated in Fig. 1. In Fig. 3 these circulators are schematically represented by boxes 30′, 30″ and 30‴, each having four terminals *a*, *b*, *c* and *d*. It is understood, of course, that these four terminals correspond to the structural terminals bearing similar designations in Fig. 1 and are interconnected electrically in the manner demonstrated with reference to Fig. 2.

Referring to Fig. 3, assume that a multichannel signal from a repeater station, illustrated by its antenna 53, is received at antenna 31. This signal is applied to multiplex circuit 32 which separates it into its component signal channels. Multiplex circuit 32 may make this separation on the basis of frequency in which case it may be a multichannel dropping filter of the type illustrated, for example, in United States Patent 2,531,447, granted to W. D. Lewis November 28, 1950, or it may make the separation on the basis of propagation modes in which case it may be a mode selecting circuit of the type illustrated in my copending application Serial No. 245,210, filed September 5, 1951. A particular channel so selected is taken from circuit 32 by way of guide 33 and is applied by guide 33 to terminal *b* of circulator 30′. The remaining channels are severally taken off by way of additional guides 34. In view of the properties of circulator 30′ described above, the energy applied at terminal *b* thereof appears only at terminal *c*, none of it appearing at terminals *a* and *d*. Terminal *d* of circulator 30′ is terminated in its characteristic impedance in a reflectionless manner by a non-reflecting termination 35 which prevents any wave energy reflected from terminal *c* from appearing at terminal *a*. From terminal *c* of circulator 30′, this energy is applied by way of guide 36 to the expander circuit 54.

Expander circuit 54 comprises the combination of a circulator 30″ and a non-linear impedance element 39 along with other circuit elements which will be described. The input of the expander 54 comprises terminal *a* of circulator 30″ to which the received signal energy from guide 36 is applied. The output of the expander comprises terminal *c* of circulator 30″ from which the expanded signal waves are taken by way of guide 42 to the receiving apparatus illustrated by receiver 43.

The nature of the expanding operation accomplished by expander 54 is such that the relative amplitude levels of a high level signal applied thereto are increased with respect to the relative amplitude levels of a low level signal applied thereto. In accordance with the invention, this operation is accomplished by the novel combination of circulator 30″ and a non-linear impedance element 39 which can be a crystal rectifier, a thermistor or any other non-linear device having an impedance range which is appropriate to permit the matching of the impedance of the element to the impedance of practical wave guides at substantially only one amplitude level of signal energy therein. As illustrated in the drawings, crystal element 39 is mounted within a wave-guide extension 38 of terminal *b* of circulator 30″ and extends thereacross. One terminal of the crystal may be connected directly to the wall of guide 38 and the other terminal is capacitively coupled by member 40 to the opposite wall of guide 38. The end of guide 38 may be closed. A source of direct-current bias 56 is connected in series with resistance 41 to complete the direct-current path through crystal 39 and to establish the initial bias point thereof. In an alternative arrangement, however, the crystal may be mounted externally of the wave guide in a section of coaxial line, the inner conductor of which extends into the guide to serve as a pick-up probe.

In order to cause this combination to operate as an expander, the non-linear impedance element 39 is matched to guide 38 at a low amplitude level, as for example, at the minimum signal level to be applied to the expander circuit by way of terminal *c* of circulator 30″. In view of the properties of circulator 30″ described above, all of the energy applied at terminal *a* thereof appears at terminal *b* and is applied by guide 38 to element 39. Because of the particularly chosen impedance match, all signals having amplitude levels greater than the minimum amplitude level at which the impedance match exists will be reflected by element 39 in some degree greater than the degree of reflection afforded to the minimum amplitude level signals. Further details concerning the nature of element 39 and the nature of the reflection therefrom will be considered in detail hereinafter.

Assuming for the moment, however, that certain signal components are reflected by element 39, these components return to terminal *b* of circulator 30″. In view of the properties of the circulator described above, the reflected energy appears only at terminal *c* of circulator 30″ to be coupled by guide 42 to a receiver circuit 43. None of the energy reflected by impedance element 39 nor any signal components which may be reflected from an improper match between guide 42 and receiver 43, may appear at terminal *a* of the circulator. Therefore, a perfect impedance match having all the characteristics of the prior art balanced circuit is presented at the input of the expander by terminal *a* without actually employing a balanced circuit. As is well known, the balance in the prior art circuits depends upon identical characteristics in the several components comprising the two or more balanced portions. These characteristics depend upon the amplitude of the applied signal. Furthermore, these portions are related by critical phase differences usually obtained by the lengths of transmission paths connecting them which lengths are frequency sensitive. By the present invention, however, the desirable characteristics are obtained and maintained regardless of the frequency or amplitude of the signal. The signal components which may be reflected from an imperfect impedance match between guide 42 and receiver 43 do not appear in the input since these components will appear rather in terminal *d* of the circulator and be absorbed by a non-reflecting termination 37 thereof. In particular, it is the unusual non-reciprocal property of the circulator, and more specifically, the property of the Faraday-effect element therein, that makes this unique mode of operation possible. The signal applied to terminal *a* of circulator 30″ is applied to element 39. Element 39 modifies the amplitude range of the signals reflected by it by expanding this range. The modified signals are thereafter isolated from terminal *a* and instead applied to terminal *c* of circulator 30″. At the same time the non-reciprocal property of the circulator diverts any wave reflected back into terminal *c* into the dissipating terminal *d*.

A typical receiving path has thus been traced for one channel of a multichannel repeater system from antenna 31 to receiver 43 through an expander circuit 54. A repeater system in accordance with the invention may also include a transmitting path which passes from a transmitting apparatus illustrated by transmitter 44 through a compressor circuit 55 to antenna 31. The nature of compressor 55 is such that high amplitude levels of a signal are relatively reduced while low amplitude levels thereof are relatively increased. Reserving for the moment the details of compressor 55, this transmitting path may be traced from transmitter 44, through guide 45 to terminal *a* of circulator 30‴, the input of compressor 55. The compressed signals leave compressor 55 by terminal *c* of circulator 30‴ and are applied by guide 50 to terminal *a* of circulator 30′.

In view of the properties of circulator 30′ defined above, the energy applied at terminal *a* thereof appears only at terminal *b* from which it is conducted by guide 33 multiplex circuit 32 for transmission by antenna 31. It is thus seen that circulator 30′ serves as a duplexing device by means of which the same antenna 31 and multiplex circuit 32 are employed for both the transmitting and the receiving operations. These operations may be conducted simultaneously since the non-reciprocal properties of circulator 30′ couple the received energy from terminal *b* to terminal *c* without affecting the transmitted energy coupled from terminal *a* to terminal *b*.

The details of compressor 55 are similar to the details of expander 54. Compressor 55 thus comprises the combination of circulator 30‴ and a non-linear impedance element 47. Element 47 may be a crystal in the nature of element 39 and is mounted within a waveguide extension 46 of terminal *b* of circulator 30‴ and extends thereacross, one terminal of the crystal being connected directly to the wall of guide 46 and the other terminal being capacitively coupled by member 48 to the opposite wall of guide 46. A source of direct-current bias 57 is connected in series with resistance 49 to complete the direct-current path through crystal 47 and to establish the initial bias point thereof. The end of guide 46 is closed. In order to cause operation of this combination as a compressor, non-linear crystal impedance element 47 is matched to guide 46 at a high amplitude level, as for example, at the maximum signal level to be applied to the compressor circuit by way of terminal *a* of circulator 30‴. All signals leaving circulator 30‴ by guide 46 of amplitude less than the maximum amplitude level are thus reflected in some degree greater than the degree of reflection afforded to the maximum signal level. The reflected energy returns to terminal *b* of circulator 30‴ and appears only at terminal *c* thereof, the output of compressor 55. As in the expander circuit described above, the perfect impedance match of a balanced circuit is presented to transmitter 44 by terminal *a* of circulator 30‴, inasmuch as all energy not reaching circulator 30′ is dissipated in the reflectionless impedance 51 terminating terminal *d* of circulator 30‴.

Further consideration has been reserved above as to the nature of non-linear impedance elements 39 and 47, the manner in which they are matched to the impedance of guides 38 and 46, respectively, and the nature of the reflections therefrom. In considering these characteristics, one specific type of non-linear element, the silicon rectifier, may be taken as an example. It will be recalled that such rectifiers have a non-linear voltage versus current characteristic. When a sinusoidal wave is applied across the crystal, the effective impedance of the crystal depends upon what part and how much of the voltage versus current characteristic of the crystal is covered by the wave. A change in the level of the incident wave changes the part of the crystal characteristic covered. Thus, the level of the wave is effective to determine the impedance presented thereto. Since the impedance so presented to an incident wave necessarily has different values for different incident energy levels, the crystals 39 and 47 can be matched to the wave guides 38 and 46 at only one energy level and will therefore present a mismatch to the respective wave guides at all other energy levels.

In compressor 55 the impedance of the crystal 47 is matched to the wave guide 46 at a high level of incident energy. Thus, the reflected wave amplitude is roughly proportional to the incident wave amplitude at low signal amplitude levels since the degree of mismatch will then be a maximum. As the amplitude of the incident energy increases, however, the impedance of the crystal 47 will begin to change in a sense to improve the match and the ratio of reflected energy to incident energy will become smaller. Ultimately, further increase in incident energy will produce no further increase in reflected energy since maximum absorption of the energy by the crystal termination then occurs. As a result the reflected wave amplitude remains substantially constant upon increase of the incident energy beyond a certain level. This type of characteristic is shown by curve 62 of Fig. 4 and may be recognized as a conventional limiter characteristic.

If, on the other hand as in expander 54, the crystal impedance 39 is matched for very small amplitudes of incident energy, substantially no output will be obtained from terminal *c* of circulator 30″ for low level energy since substantially all such energy incident upon crystal 39 will be absorbed thereby. As the level of the incident energy is increased, however, the impedance of crystal 39 will change with the result that the amount of energy reflected from the crystal termination will increase and an output will appear in terminal *c*. Because of the usual impedance characteristic of crystal, the amount of reflected energy increases relatively more rapidly than the incident energy as the crystal becomes progressively more poorly matched to wave guide 38 in which it is mounted, and an input-output characteristic of the type shown by curve 61 of Fig. 5 will be obtained.

In the adjustment of the compressor or expander circuits in accordance with the invention, it is necessary only to apply an input wave of appropriate energy level and adjust the position and/or other characteristics of the crystal terminations to obtain maximum output. Thus, to obtain a compressor characteristic for compressor 55, a test signal of very high level is applied to input terminal *a* and a suitable output meter is connected to output terminal *c*. After an initial adjustment of bias source 57 and its series resistor 49 to supply direct-current bias power to crystal 47 which is small compared to the signal power delivered thereto, the precise value of bias current, the distance from the closed end of guide 46 to crystal 47, the relation of crystal 47 to the longitudinal center line of guide 46, and the position of capacitive element 48 away from crystal 47, are all adjusted in accordance with well-known principles for matching the impedance of a crystal to that of a wave guide at a given energy level until the output meter indicates a minimum. Similarly, these same parameters in expander 54 may be adjusted by applying a test signal of very low energy level to input termination *a* and again adjusting the crystal termination 39 for minimum output.

Fig. 6 illustrates a modification of the circulator of Fig. 1 which is particularly suited for practical applications in accordance with the invention. It will be noted that in Fig. 3 energy in terminal *d* of each of the circulators 30′, 30″ and 30‴, was dissipated. In Fig. 6, therefore, a modified right-hand portion of the circulator of Fig. 1 is shown. The principal modification is seen to reside in the manner in which this wave energy, which is polarized perpendicular to the effective plane of polarization of wave energy in guide 13, may be dissipated. Reference to Figs. 1 and 3 will indicate that wave energy in this polarity was therein transferred from guide 12 into guide 16 constituting terminal *d* and thereafter dissipated in one of the reflectionless terminations. In Fig. 6, however, a vane 65 of resistive material, several wavelengths long, is diametrically disposed in guide 12 in the plane of the wave energy to be dissipated. In accordance with usual practice, the ends of vane 65 may be tapered to prevent undue reflection from the edges thereof. Fig. 6 also illustrates how a non-linear impedance element, illustrated schematically by a crystal element mounting structure 66, is located to terminate guide 13 as, for example, element 39 terminates guide 38 of the circulator 30″ of Fig. 3.

In all cases, it is understood that the above-described arrangements are simply illustrative of a small number of many possible specific embodiments which can represent applications of the principles of the invention. Numerous and varied other arrangements can readily be devised in accordance with said principles by those skilled in the art without departing from the spirit and scope of the invention.

What is claimed is:

1. Apparatus for modifying the range of applied electro-magnetic wave energy which is subject to variation in amplitude level over a range, said apparatus comprising connected sections of wave guide each adapted to support said wave energy in a plurality of polarizations, a pair of polarization-selective connections at one section of said guide each coupled to one of a pair of orthogonal polarizations of wave energy therein, a polarization-selective connection at another section of said guide coupled to a polarization of wave energy therein related by an angle to one of said polarizations in said one section, means for applying said wave energy to one of said connections, a load circuit connected to a second of said connections, an impedance which is non-linear with respect to the amplitude of said wave energy connected to the remaining connection, said impedance being matched to said remaining connection only for an amplitude level of said applied wave energy at an extreme of said range of variation, an antireciprocal rotator for producing a Faraday-effect rotation of the polarization of said energy interposed in a section of said guide between said one and said other sections.

2. Apparatus in accordance with claim 1 wherein said non-linear impedance is matched to said remaining connection for high signal amplitude levels of said wave energy whereby the amplitude range of said waves is compressed.

3. Apparatus in accordance with claim 1 wherein said non-linear impedance is matched to said remaining connection for low signal amplitude levels of said wave energy whereby the amplitude range of said waves is expanded.

4. The combination according to claim 1 wherein said angle is equal to 45 degrees and wherein said rotator produces an angle of Faraday-effect rotation equal to 45 degrees.

5. A compressor-expander means for a modulated high frequency signal, said means comprising a four branch network having a first pair of conjugately related branches and a second pair of conjugately related branches, one branch of said first pair being connected within said network to one branch of said second pair for electrical transmission between said pairs in a given direction only and to the other branch of said second pair for the opposite direction only, the other branch of said first pair being connected to respective branches of said second pair only for directions of transmission between said pairs respectively opposite to the aforesaid directions, each of said branches having characteristic impedances, input means and output means for said signal being connected respectively to the branches of said first pair, a non-linear impedance element connected to said one branch of said second pair, and means for developing a direct current bias voltage across said element of strength which matches the effective impedance of said element to the characteristic impedance of said one branch at a single level of said signal to a greater extent than wave energy at other levels of said signal, said means comprising an external circuit including said element and a load impedance and a source of fixed bias voltage for said element.

6. In combination, a non-reciprocal four branch coupling circuit for electromagnetic wave energy comprising first and second pairs of individual branches and a single common branch connecting each pair to the other, the individual branches of each pair being connected in conjugate relation to each other and in polarized coupling relation to the common branch, said circuit having a first two mutually exclusive transmission paths for wave energy transmitted between said pairs in one direction and a further two mutually exclusive transmission paths for wave energy transmitted in a direction opposite to said one direction, first and second means connected to two of said individual branches for launching a wave of energy at one end of at least two of said transmission paths traveling therein in each case toward the opposite end of the respective path, third and fourth means connected to the remaining individual branches at said opposite end of each of said two paths for utilizing wave energy transmitted in that path, said paths being isolated from each other by a non-reciprocal means included in said common branch for producing an antireciprocal rotation of polarized wave energy in said first two paths from a polarization of each one of said first pair of branches into a polarization of a respective one of the branches of said second pair and also a rotation of wave energy in said further two paths from the polarization of each one of said second pair of branches into the polarization of a respective one of the branches of said first pair.

7. In combination, a non-reciprocal four branch network comprising first and second sections of wave guide, means comprising first and second polarization-selective wave guide connections for said first section for coupling to and from first and second orthogonal polarizations of electromagnetic wave energy therein, means connected to each of the connections of said first section for launching wave energy respectively in said first and second polarizations, means comprising third and fourth polarization-selective wave guide connections for said second section for coupling to and from third and fourth orthogonal polarizations of electromagnetic wave energy therein, means connected to each of the connections of said second section for utilizing wave energy respectively in said third and fourth polarizations said third and fourth polarizations being related by an angle to said first and second polarizations respectively, and a polarization rotator of linearly polarized wave energy interposed between said sections, said rotator having an angle of rotation for wave energy propagated from said first section into said second section equal to and in the same sense as the angle between said first and third polarizations and as the angle between said second and fourth polarizations, said rotator having an angle of rotation for wave energy propagated from said second section into said first section equal to and in the same sense as the angle between said third and second polarizations and as the angle between said fourth and first polarizations.

References Cited in the file of this patent

UNITED STATES PATENTS

| | | |
|---|---|---|
| 2,425,345 | Ring | Aug. 12, 1947 |
| 2,438,119 | Fox | Mar. 23, 1948 |
| 2,441,598 | Robertson | May 18, 1948 |
| 2,525,901 | Hansen | Oct. 17, 1950 |
| 2,606,248 | Dicke | Aug. 5, 1952 |
| 2,619,540 | Lundstrom | Nov. 25, 1952 |
| 2,644,930 | Luhrs | July 7, 1953 |

OTHER REFERENCES

Ragan: Microwave Transmission Circuits, vol. 9. Radiation Laboratory Series, published 1948 pp. 375–78.